Sept. 6, 1932.   G. FROVA   1,876,492
FRUIT PITTING MACHINE
Filed Jan. 31, 1930   2 Sheets-Sheet 1
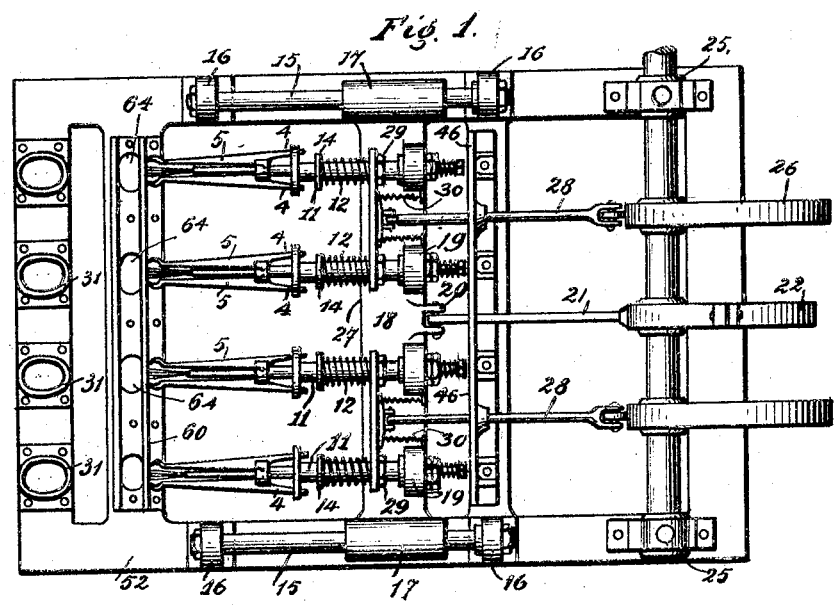
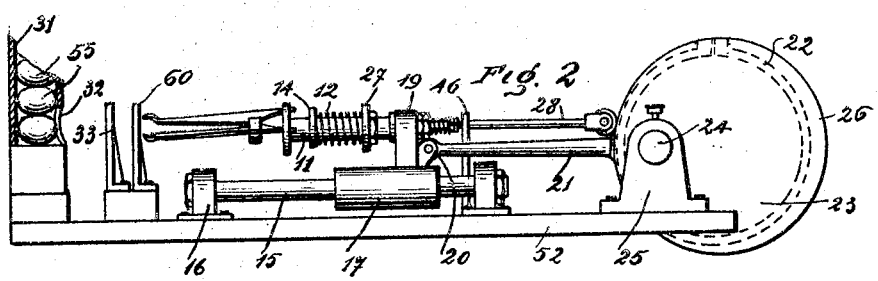
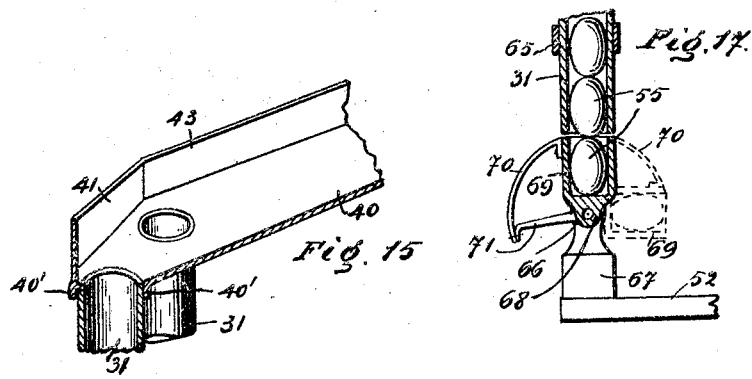

Sept. 6, 1932.   G. FROVA   1,876,492
FRUIT PITTING MACHINE
Filed Jan. 31, 1930   2 Sheets-Sheet 2
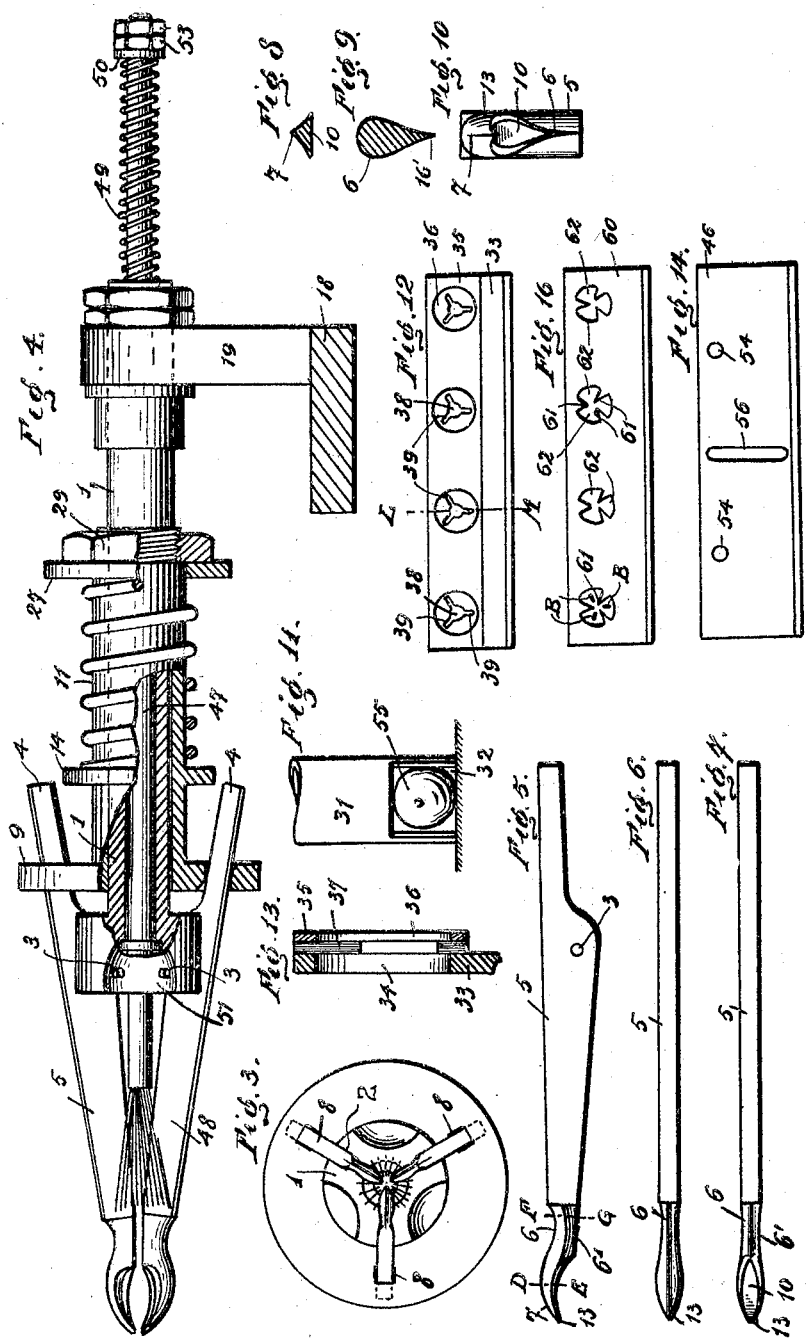

Patented Sept. 6, 1932 1,876,492

UNITED STATES PATENT OFFICE

GIOVANNI FROVA, OF MILAN, ITALY

FRUIT PITTING MACHINE

Application filed January 31, 1930, Serial No. 424,964, and in Italy February 11, 1929.

The present invention relates to a fruit pitting machine.

The machine essentially comprises:

(a) A frame, or a perforated plate, carried on uprights or legs and representing the base-plate;

(b) Supports fixed to the said base, for supporting a shaft driven at the desired speed by a motor or manually;

(c) One or more eccentrics, or one or more cranks, fitted on the said shaft;

(d) One or more eccentric discs or cams mounted upon said shaft;

(e) A carriage adapted to travel longitudinally on the said base;

(f) One or more connecting links for connection of this carriage to the said eccentrics or cranks;

(g) One or more pit-extracting tools in the form of tongues of the kind disclosed in my prior U. S. Patent No. 1,698,477 January 8, 1929. The tool portion on which the pit gripping members are pivoted are fixed to the carriage abovesaid, whereas the portion by which the movement of the said gripping members is operated is under the direct or indirect control of the abovesaid cams;

(h) One or more replaceable open bottom tubes each arranged, preferably vertically, in alignment with a corresponding pit-extracting tool. The fruits to be pitted are placed in each tube to form a column, the cross section of the tubes suiting the shape of the fruits to be dealt with and being slightly in excess of the fruit diameter;

(i) A window formed in the bottom end of each tube, the bottom edge of the window being flush with the tube bottom and the window being symmetrically arranged in front of the pit-gripping-and-extracting tools. It is of such dimensions as to allow the piece of fruit, the pit of which has been gripped by the said tools, to pass readily out of the tube;

(j) A hopper arranged at the top end of the tubes, with the hopper bottom fitted with holes coinciding with the opening of each tube. This hopper is filled with the fruits that are to be dropped into the tubes either by hand or by a suitable device already known;

(k) One or more crossbars carried from the abovesaid base-plate and parallel to the aligned tubes as well as to the pit-gripping-and-extracting tools as well as to the tool carriage. The said crossbars support a corresponding plate of relatively elastic and yielding material such as vulcanized rubber, and are provided with coincident windows, the centers of which lie in alignment with the axis of the respective tools, while in the elastic plates, opposite the center of each window, a hole is formed with radial cuts extending from the hole and staggered relatively to each other in accordance with the angular displacements of the gripping tools pivotally secured to the central portion of the corresponding pit-gripping-and-extracting tool. The distance between the said crossbars and the tubes is adjustable so as to be always slightly in excess of the axial length of the fruits to be pitted;

(l) A device for removing from the gripping arms of the said tools any extracted pits that might still be sticking to said arms. The device essentially comprises one or more fixed plates supported from the baseplate and interposed between the crossbars and the tool carriage. In these plates, large holes are formed, with their centers lying each on the extension of the axis of the corresponding tool, and from the edge of these holes radial lips extend without the inner ends of the lips touching one another, so that a free space is left in the center. The lips are evenly spaced apart and staggered relatively to the pit-gripping tools so that their ends, in the last phase of the return stroke of the tools, remove from the gripping tools any pits still sticking thereto;

(m) A brush arranged within that portion of each pit-gripping-and-extracting tool that is fixed to the carriage, the brush being secured to a rod that traverses the said portion axially and extends past the rear end of said portion; a spiral spring acting between the rear end of the said stationary portion and a flange at the rear end of the rod. This spring serves to retain the brush inside the tool, while a stop against which the flanged end of the rod strikes in the last phase of the return stroke of the carriage forces the rod to slide relatively to the tool in order to remove the brush therefrom and compel the brush to clean the gripping arms and to expel the pits still sticking to said arms in case the device spoken of in *l* should not be present;

(*n*) According to a modified construction, the tubes and windows spoken of at *h* and *i* may be replaced by tubes open at both ends and suitably clamped between plates supported by brackets carried on the baseplate of the machine. These tubes have a circular section slightly larger than the cross section of the fruits so as to compel the fruits to arrange themselves with their major axis parallel to the axis of the tubes.

A little below the bottom end of each tube a cylindrical socket is arranged, the cross section of which is equal to the cross section of the respective tube and coaxial thereto. The various sockets are firmly connected to each other, and their bottom is provided with a perforated lug. The various lugs are traversed by a spindle carried from the baseplate of the machine in such a manner that the spindle supports can be made to oscillate by any suitable means through an angle, between two planes; in one of these planes lie all the axes of the tubes, in the other plane lie all the axes of the pit-gripping-and-extracting tools, and the two planes cross each other at the axis of the spindle about which the sockets are oscillating. Midway of the front edge of each socket is fixed one end of a bent plate the other end of which is fixed to an arm fixedly secured to the vessel. The center of the circle to which the plate is bent lies on the axis of the spindle about which the sockets are adapted to oscillate. The object of this plate is to close the tubes when the sockets are tilted in order to bring their axes in line with the axes of the pit-gripping-and-extracting tools. When the sockets are in the said last position, the pit-gripping-and-extracting tools will perform their function, i. e., they will penetrate into the fruit, grip the pits, and extract the fruits from the sockets, and then extract the pin in the manner that will be described below. After the fruits have been extracted from the sockets, the vessels are brought back into their former position and permit another piece of fruit to enter and replace the extracted one.

Further advantages as well as working features will become obvious from the following description and from the drawings referred to, which illustrate, by way of example, an embodiment of the invention as applied to a machine designed to pit four pieces of fruit at a time. Of course it is understood that the machine may be designed also to pit a single piece of fruit or more or less than four pieces of fruit at a time.

In the accompanying drawings:

Figure 1 is a plan view of my improved machine.

Figure 2 is a side elevation thereof.

Figure 3 is a view showing a tool of my machine to a larger scale.

Figure 4 is a side view of the said tool, partly in section.

Figure 5 is a top view of one of the cutting members.

Figure 6 is a rear view thereof.

Figure 7 is a front view thereof.

Figures 8 and 9 are two cross sections along the lines D—E and F—G respectively in Figure 5.

Figure 10 is an end view of Fig. 5, looking from left to right.

Figure 11 is an elevation of the lower portion of a tube in which the fruits to be pitted are introduced, and shows the window formed in the bottom end of the tube.

Figure 12 shows in a larger scale the crossbars having large corresponding windows therein with the clamping of the elastic plate, in which a center hole with radial cuts is formed.

Figure 13 is a sectional view along lines L—M of Figure 12.

Figure 14 shows a detail in elevation.

Figure 15 shows to larger scale, in perspective view and in vertical section, the upper end of a tube in which the fruits are introduced, as well as the hopper feeding the various tubes with fruits.

Figure 16 is a detail showing in elevation a means for the positive removal of the extracted pits from the pit extracting members.

Figure 17 shows a modified construction of the means for receiving the fruits to be pitted and for holding the said fruits opposite the pit-gripping-and-extracting means.

Referring now to Figures 1 and 2, 52 is the machine base consisting of a frame or a perforated plate and carried on suitable supports.

On brackets 16, carried on the two parallel sides of the base 52, the ends of two parallel rods 15—15 are fixed, and on each rod 15 a sleeve 17 is adapted to slide.

The two sleeves 17—17 are connected to opposite ends of a plate 18. In order to minimize the friction between the rods 15 and the sleeves 17, grooves may be formed in the contacting surfaces of these parts for reception of balls or rollers. The sleeves 17—17 may be replaced by any other contrivance capable of so supporting the plate 18 that this plate can be reciprocated like a carriage.

To vertical brackets 19 carried on the plate 18, which henceforth is referred to as "the carriage", the rear ends of the tubes 1 are fixed (Figure 4). These tubes form part of the pit-gripping-and-extracting tools, and the machine may comprise one or more of such tools according to the number of fruits which it is intended to pit at a time.

At the end of each tube 1, deep radial grooves 2 of U-shape are formed, the grooves being evenly spaced apart and their bottoms forming a certain angle with the tube axis; the bases of all the grooves are inclined at the same angle. In each groove 2 a bar is adapted to swing about a corresponding pivot 3. In the following, for brevity's sake, these bars will be called "tongs", inasmuch as their ends are adapted to be moved nearer to or away from each other like the shanks of a tong. 11 is a sleeve slidably mounted on the tube 1 fixed to the carriage 18.

The rear shanks 4 of the various tongs each traverse a corresponding radial slot 8 formed in an annular flange 9 provided at the forward end of the sleeve 11. The inner and outer sides of each slot 8, against which the inner and outer sides of the rear shanks 4 slidably bear are so shaped that at each longitudinal displacement of the sleeve 11 relatively to the tube 1 the said sides of the rear shanks always touch the said sides of the slots 8, thus causing the tongs to be moved nearer to or away from each other.

The forward shank 5 of each tong is destined to be driven into the fruits to make radial cuts therein. These cuts are made during the forward stroke of the tool, and by virtue of the radial arrangement of the tongs, the latter, after the cut is made, can grip the pits to extract them from the fruit. This takes place during the return stroke of the tool.

In the accompanying drawings (Figures 3 to 10) a tool is shown fitted with three tongs pivotally mounted in three grooves formed in the tube 1. Of course the tool might also have two tongs only or more than three.

Each tong is built as follows:

In a portion 6 of the forward shanks 5, the metal is thinned down so as to form a cutting edge 6' on the inner side of the shank and a thickened portion on the opposite side. The thickened portion may be rounded off. The cross section of this portion 6 of the shank 5, as seen from the side of Figure 7 exhibits the form of a crescent, the concavity of which is turned to the axis of the tool. This portion of 5 goes over into the portion 6 gradually with a curved line, and its side turned to the tool axis exhibits a concave surface 10 (Figures 5 and 7) having an elliptical profile with pointed ends. The rear pointed end of the said elliptical surface goes over into the cutting edge 6' of the said portion, while the opposite end constitutes the pointed forward end 13 of the tong. The end 13 merges into a cutting edge 7 provided along the center line on the back of the end portion of the tong.

The cutting edge 7 is obtained by giving to this last end portion, starting from the line D—E in Figure 5 and extending up to the pointed end 13, a triangular section with concave sides, substantially similar to the section shown to a larger scale in Figure 8. Of course the section in question tapers down from the line D—E until it reduces itself to a point at 13.

In the axial bore of the tube 1 fixed to the carriage 18 and having the tongs pivoted to it, a slidable rod 47 is lodged extending past the rear end of the tube 1 and terminating with an expansion or flange, which may consist of, as shown by way of example in Figure 4, a washer 50 secured by screw bolts 53 to a shoulder provided at the rear end of the rod. The spiral spring 49, threaded on the rod between the flange 50 and the rear end of the tube 1 tends to draw the rod 47 out of the tube from the rear. A flange 51, formed integrally with, or secured as a separate piece on the front end of the rod 47, normally bears against a shoulder formed inside of the front end of the tube and prevents the rod 47 from being forced out of the tube from the rear. To the forward end of the rod 47 is secured in any convenient manner a brush 48 which, when the tool is at rest, is retained near the forward end of the tube, whereas during the last phase of the return stroke of the pit-gripping-and-extracting tool the brush is driven forward between the tongs owing to an abutment, consisting for instance in a plate 46, Figure 14, against which the rear flange 50 of the rod 47 strikes, thus compressing the spring 49. This device serves to clean the gripping shanks of the pitting tools when the plate 60 referred to hereinafter is not provided. It may also serve to remove any pits that may have remained stuck to the tongs.

The carriage 18 is pivotally connected at 20 to one or more eccentric rods 21. A single such rod is shown on the drawings fixedly connected to the eccentric strap 22, with the eccentric sheave 23 formed integrally with, or keyed to the shaft 24, carried in supports 25 resting on the base 52. The shaft 24 may be driven at the desired speed either by hand or by motor, with or without power transmitting or speed varying gears.

On the shaft 24 disc cams 26 of suitable contour are likewise keyed to or formed integrally with the shaft.

On the tube 1 of each pitting tool is disposed, as already stated, the sleeve 11, adapted to slide on the tube 1 and move relatively to the latter. The rear ends of the various sleeves pass through holes formed in a cross bar 27; a stop 29, for instance in the shape of a nut screwed on the rear end of the muff 11, prevents the cross bar 27 from disengaging itself from the sleeves. The cross bar 27 is held against the stop 29 by a strong spiral spring 12 wound around the sleeve 11 and acting by expansion between a flange 14 on the sleeve 11 and the said cross bar 27.

In the drawings, which refer to a four pitting-tool machine, two cross bars 27 are shown, each of which serves to connect the sleeves 11 of the said tools in pairs. It is obvious however that the machine may also have a single tool and a single cross bar 27, or any desired number of tools, the sleeves of which may be connected in pairs in any desired number by any number of cross bars 27.

Rods 28, secured to the cross bars 27 at convenient points, bear with their opposite ends against the periphery of corresponding cams 26 mounted upon shaft 24. Between the carriage 18 and the cams 26 and eccentric 22—23 a cross bar 46 (Figures 1, 2, 14) is arranged edgewise. In this bar are formed a slot 56, through which the eccentric rods 21 pass, as well as the holes 54—54 through which the rods 28 are guided. Suitable guiding means for the rods 28 may also be provided in the vicinity of the cams 26.

The stationary cross bar 46 constitutes the member against which the rear flanges 50 of the rods 47 sliding in the tubes 1 strike in the final stage of the return stroke of the carriage 18 and tubes 1. The cross bar 46 then, against the reaction of the spring 49, obliges the tubes 1 to slide axially relatively to the rods 47 and to bring the brushes 48 between the tongs of the pitting tool, with the result that the tongs are cleaned, and the pits still sticking to the tongs are removed therefrom.

Spiral springs 30, one end of each of which is secured to the carriage 18 and the other to the cross bar 27, serve to ensure that the rear end of the rods 28 shall always bear against the periphery of the cams 26 and that consequently the cams 26 shall always effect with certainty the intermittent movement of the sleeves 11 relatively to the tubes 1 in order that the tongs of the pitting tools may move nearer to or away from each other at the proper time.

At the forward end of the base 52, tubes 31 with open bottoms, and preferably vertical, are arranged in line with each other. In the drawings (Figure 1), the tubes 1 are shown as oval in section for the reception of fruits of essentially oval shapes, such as plums, but obviously any other section may be adopted for these tubes to suit the shape of the fruits to be dealt with.

The tubes 31 are mounted in the machine in such a manner as to allow their ready removability, for replacement by other tubes suiting the shape of the fruits to be pitted.

At the top of the tubes 31, all of which are of same height, a plate 40 is provided in which holes are formed opposite the top openings of the tubes, the plate being connected to the tubes by means of pieces 40' see detail Figure 15. A relatively low front plate 41, a correspondingly higher rear plate and two side plates, one of which, 43, is illustrated, are connected with each other and with the edges of the plate 40 to form a hopper into which the fruits are filled in bulk. From this hopper the fruits are dropped into the tubes 31 either by hand or by means of a mechanical device not shown so as to build inside of each tube a column of superposed pieces of fruits. The hopper shape may differ from the shape shown and described.

Close to the bottom of each tube 31 (Figures 2 and 11) a window is formed in the tube side, the lower edge of the window being flush with the tube bottom, and the size of the window being sufficient to allow a single piece of fruit to pass easily through at a time. Each window center lies on the extension of the axis of the corresponding pitting tool.

With reference to the modified construction illustrated in Figure 17, the tubes 31 are open at both ends and circular in section so that the fruits are obliged to arrange themselves with their major axis parallel to the axis of the tube. The tubes 31 are conveniently supported by plates 65 resting on brackets (not shown) supported by the machine base 52. On spindles 66, resting on supports 67 carried by the base 52, are pivotally mounted the lugs 68 projecting past the bottom end of cylindrical sockets 69, coaxial with the tubes 31. A small gap is left between the top opening of the sockets 69 and the bottom opening of the tubes 31. The pieces of fruit 55, plums, for instance, arrange themselves substantially as shown on the drawings, and the length of the sockets 69 is approximately equal to the length of the fruits to be pitted. A plate 70, bent to form an arc the center of which lies on the axis of the spindle 66 is fixed by one end to the front upper edge of 69, and by its other end to an arm 71 which is rigid with the socket 69.

Suitable mechanical means (not shown) are provided for simultaneously tilting all the cylindrical sockets 69 and bringing them at the right moment from the position shown in full lines corresponding to the fruit receiving position, into the position shown in dotted lines in which latter the pitting tools can drive into the pieces of fruit, seize the pits, extract the fruits from the sockets 69, and then perform the pit extracting operations. While being tilted, the plates 70 slide against the bottom end of the tubes 31 and thus prevent the fruits contained in the latter from dropping out. After the fruits have been extracted from the sockets, the sockets are restored into their former position and then a piece of fruit will drop into the socket and take the place of the previously extracted piece.

Between the row of aligned tubes 31 and the carriage 18, a cross bar 33 is slidably carried on the base 52 in such a manner that it can be moved nearer to or away from the tubes 31 and be fixed at the desired distance from the latter, yet always in parallel relation to the same. In the cross bar 33, windows 34 are formed with the center of each window lying on the extension of the axis of the corresponding pitting tools, on which extension also the center of a window 32 of the corresponding tube 31 lies. Between the said cross bar 33 and a second cross bar 35 fixed to the former one in any desired manner, and provided with windows 36 of the same size as and registering with the windows 34 of the former bar 33, a plate 37 of relatively elastic material, such as vulcanized rubber, is clamped. In line with the centers of each pair of windows 34—36, a hole 38 is formed in the plate 37, and from the periphery of this hole extend radial cuts 39. In Figure 12 of the accompanying drawings, only three such radial cuts are shown, they being spaced 120° apart from each other to suit the spacing of the three tongs of the pitting tool. As the said cuts are so disposed that they coincide with the radial position of the tongs pivotally attached to the pitting tool, these tongs in the forward stroke of the carriage and tools can pass through the holes of the plate 37 and swing on their pivots 3, and reach into tubes 31 through the respective windows 32. The length of the forward stroke is so adjusted that the tongs stop at a certain distance from the rear wall of the tube, that is to say, from the wall opposite to that in which the window 32 is cut. Between the cross bar 33, carrying the elastic plate 37, and the carriage 18 a cross bar 60 is arranged, this too being carried on the machine base 52. The plate 60 is provided with holes 62 comprising as many evenly spaced radial lips 61 as are the gripping arms upon the pitting tools.

As diagrammatically shown on Figure 16, the radial lips 61 do not unite at the center but are so arranged that they get between each pair of gripping arms B; if any pits have remained sticking to the said arms, in the last phase of the backward stroke of the tools the pits strike against the lips 61, which prevent them from following the further backward movement of the tool, and cause them to drop into an underlying basket or the like.

The working of the complete machine is as follows:

The fruits are filled in bulk into the hopper from whence, either by hand or mechanically, they are caused to drop into the various tubes 31 and to form therein a column consisting of single pieces of fruit on top of each other.

As the bottom edges of the tube windows 32 are flush with the tube bottom, a single piece of fruit 55 will lie in front of each window in such a position that it can be extracted through the window in the manner that will be described below; after this the overlying fruit column will descend by its own weight and the directly superposed piece of fruit will take the place of the fruit that has been extracted. The attendant or a suitable mechanical distributor will now take care that another piece of fruit shall descend from the hopper into each tube 31 and replace the extracted one.

Let us assume that when at rest the machine parts occupy the positions in which they are shown in Figures 1 and 2; the carriage 18 and the pit-gripping-and-extracting tools namely are at the end of their return stroke, with the gripping tongs open and the brushes lying between the tongs.

Let us now assume that the machine is started. The first quarter turn of the eccentric 23 and cams 26 will result in: a forward movement of the carriage 18 and, owing to the action of the springs 49, a return of the brushes 48 towards the inside of the tubes 1 of the pitting tools; a greater forward movement of the sleeves 11 disposed on the tubes 1, resulting in the convergence of the tongs towards each other so that they can pass through the holes 38—39 of the flexible plate 37 clamped between the bars 33 and 35.

On the next quarter turn of the eccentric 23 and cams 26 the carriage 18 will continue its forward movement until the end of the forward stroke, and bring the tongs inside of the tubes 31 through the tube windows 32. In this second phase of the forward movement of the carriage 18, the tongs, owing to the forward impulses intermittently imparted to the sleeves 11 by the cams 26 and cam rods 27, are firstly moved slightly apart in order that they may penetrate into the fruits and make radial cuts around the pits, and are finally moved close to each other for the double purpose of gripping the pits and completing, with their cutting edges 6', the radial cuts in the fruit portion facing the windows.

During the remaining half revolution of the eccentric 23 and cams 26, the following operations are performed in succession:

(1) Extraction of the fruits from the tubes 31 through the windows 32;
(2) Extraction of the pits from the fruits;
(3) Dropping of the pits from the gripping tongs;
(4) Cleaning of the tongs.

The first operation is obtained by so designing the contour of the cams 26 that during the first phase of the return stroke, the cams act upon the rods 28, and this also upon the cross bars 27 and sleeves 11 in such a manner as to maintain the tongs in closed conditions. The pull exerted on the pits during the said return movement of the tools obliges the fruits to participate in the movement of the pits; the fruits are therefore extracted from the tubes and carried into contact with the elastic plate 37.

The second operation is obtained by so designing the contour of the next corresponding part of the cams 26 that, after the fruits have come into contact with the said plate 37, the gripping tools can continue their backward movement in closed conditions. The result will be that, as the fruits cannot go farther than the plate 37 by which they are elastically retained, they will separate from their pits and freely drop into an underlying basket or the like, whereas the tongs with the pits therein will pass through the hole 38 and radial cuts 39 of the plate 37.

The third operation is obtained by so designing the contour of a further successive portion of the cams 26 that the backward stroke speed imparted by these cams to the sleeves 11 is greater than the backward stroke speed imparted by the eccentric 23 to the carriage 18 and to the pitting tools mounted thereon. Owing to this fact the gripping tongs are opened inasmuch as the sides of the windows 8 provided in the flange 9 of the tube 1 force the rear shanks 4 of the gripping arms to approach each other, and their forward shanks 5 to move away from each other. All the gripping arms are free to move in the holes 62 of the plate and, on the backwards stroke of the tools, any pits that may have remained sticking to the gripping tools will strike against the lips 61, which will detach them and make them drop through the baseplate apertures 64 into the underlying basket or the like.

The fourth or tong-cleaning operation is performed during the last phase of the backward stroke for which the corresponding portion of the contour of the cams 26 is so designed that the sleeves 11 move backward at the same speed as the tubes 1 on which they are mounted.

In this last phase of the backward stroke the flanged portions 50 of the rods 47 encounter the stationary cross bar 46. As the rods 47 now can no longer participate in the backward movement of the carriage 18 and tubes 1, the further backward travel of the tubes 1 will cause the brushes 48 to project past the forward end of said tubes. The tongs, which in the meantime have remained in open condition, will rub against the brushes 48 and be cleaned. Should the above mentioned plate 60 with its radial lips 61 have failed to perform its cleaning function, any pits still remaining adherent to the tongs will be detached by the brushes 48. This arrangement may be omitted as not strictly necessary; it is employed especially when no plate 60 with radial lips 61 is provided.

The described cycle of operations may be repeated as many times as desired.

It is likewise obvious that the plate 60 with radial lips 61 may be employed also in connection with other fruit pitting machines having tong-like members similar to those shown on the accompanying drawings, for instance those disclosed in the United States Patent No. 1,698,477.

Obviously the machine described and shown is susceptible of numerous modifications concerning its form of construction and arrangement, any such modifications as may be thought out by persons skilled in the art still remaining within the scope of the invention described above and shown on the accompanying drawings only by way of example and illustration.

Having now particularly described and ascertained the nature of my said invention and in what manner the same is to be performed, I declare that what I claim is:—

1. A fruit pitting machine comprising a pit extracting tool, means to operate said tool, means to predispose the fruit to be pitted in the path of said pit extracting tool, means also arranged in the path of said tool and ahead of said second named means, said third named means being traversed by said tool, and forming a stop for unpitted fruits carried by said tool, means to detach, from said tool, pits carried thereby and means carried by said tool to clean said tool.

2. A fruit pitting machine including a pit extracting tool, gripping members on said tool, a bore in said tool, a rod in said bore, said rod extending beyond the rear of said tool, a spring on said extending portion of said rod, a shoulder on the end of said rod, said spring bearing between the end of said tool and said shoulder, a stop on said rod limiting the motion of said rod by said spring, a brush fixed to the forward end of said rod and normally positioned behind said gripping member, means to contact with the rear end of said rod to force the rod against the action of said spring whereby said brush is forced into engagement with said gripping members to clean them.

3. A fruit pitting machine comprising a pit extracting tool, means to operate said tool, fruit receiving means comprising a tube open at both ends, a cylindrical socket arranged beneath and coaxially with said tube, said socket being pivotally mounted, a plate bent to the arc of a circle and secured to said socket, said plate closing the end of said tube upon rotation of said socket, said socket swinging from alignment with said tube to alignment with the axis of said tool.

4. In a fruit pitting machine, a pit extracting tool comprising a stem, a sleeve on said stem, a plurality of pit gripping arms pivoted on said stem, said sleeve being connected to one end of each of said arms to move the same about their pivots upon relative motion of said sleeve and stem, means for reciprocating said stem, means for moving said sleeve in a predetermined manner relative to said stem during said reciprocation, said last named means moving said arms so that upon engagement with the fruit the said arms are spaced slightly apart so as to make short radial cuts in the fruit and subsequently are moved towards each other to complete radial cuts along the axis of the fruit and extending to the pit.

5. In a fruit pitting machine, a pit extracting tool comprising a stem, arms pivoted on said stem, means for reciprocating said stem, means for swinging said arms about said pivots, each of said arms being formed at their forward end with a curved concave inner surface, said inner surface having an elliptical contour with pointed forward and rear ends and a convex outer surface with a cutting edge thereon, the forward end of said cutting edge terminating at said pointed forward end of said inner surface, a cutting edge on said arm, the rear end of said cutting edge on said convex surface joining the cutting edge on said arm.

6. In a fruit pitting machine, a fruit pitting tool comprising a stem, arms pivoted on one end of said stem, a sleeve on said stem, a flange on said sleeve, radial windows in said flange, the rear end of each of said arms engaging in one of said windows, the forward end of each arm being formed to grip and extract the pit from a fruit, means for imparting a reciprocating movement to said stem, means for moving said sleeve in a predetermined relation with respect to said stem during said reciprocating movements whereby the movements of said sleeve and stem are sometimes differential and sometimes concomitant.

7. A structure according to claim 6 in which said arms are equally spaced around said stem and are pivoted to swing radially on said stem.

Signed at Milan, Italy.

GIOVANNI FROVA.